United States Patent
Harper

(10) Patent No.: US 6,980,228 B1
(45) Date of Patent: Dec. 27, 2005

(54) MONITORING BUOY SYSTEM

(75) Inventor: Michael Harper, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 944 days.

(21) Appl. No.: 09/821,282

(22) Filed: Mar. 29, 2001

(51) Int. Cl.$^7$ .............................................. H04N 7/18
(52) U.S. Cl. ........................................ 348/81; 348/61
(58) Field of Search ........................... 348/81, 61, 124, 348/143, 158; 396/55–56, 13, 25, 419, 429, 396/427

(56) References Cited

U.S. PATENT DOCUMENTS

| | | | | |
|---|---|---|---|---|
| 4,626,852 A | | 12/1986 | Dodge | 340/985 |
| 5,689,475 A | * | 11/1997 | Chaumet-Lagrange | 367/88 |
| 6,119,630 A | * | 9/2000 | Lobsiger et al. | 119/238 |
| 6,145,393 A | * | 11/2000 | Canton | 74/5.43 |
| 6,525,762 B1 | * | 2/2003 | Mileski et al. | 348/81 |
| 6,611,662 B1 | * | 8/2003 | Grober | 396/55 |
| 6,718,130 B2 | * | 4/2004 | Grober | 396/55 |
| 2004/0208499 A1 | * | 10/2004 | Grober | 396/428 |

FOREIGN PATENT DOCUMENTS

| | | | | |
|---|---|---|---|---|
| JP | 06-1914779 | * | 7/1994 | B63C 9/20 |
| JP | 11-298884 | * | 10/1999 | H04N 7/18 |

* cited by examiner

Primary Examiner—Vu Le
(74) Attorney, Agent, or Firm—Cantor Colburn LLP

(57) ABSTRACT

A buoy system for observing and monitoring the surface of a large predetermined area of water including a flotation device; a waterproof imaging device attached to the exterior of the flotation device, the imaging device operable for obtaining continuous real-time images of the surface of the predetermined area of water; a waterproof computer partially or wholly disposed within the flotation device, the computer operable for storing the continuous real-time images of the surface of the predetermined area of water; and one or more communications devices partially or wholly disposed within the flotation device, the one or more communications devices operable for transmitting a signal representing the continuous real-time images of the surface of the predetermined area of water to an operator at a remote location.

18 Claims, 4 Drawing Sheets

MONITORING BUOY SYSTEM

BACKGROUND OF THE INVENTION

The present invention relates generally to a system for observing and monitoring the surface of a large predetermined area of water and, more specifically, to a monitoring buoy for providing a continuous, remote, real-time image of the surface of a large predetermined area of water.

It is desirable, in a variety of situations, to observe and monitor the surface of a large predetermined area of water for activity. For example, businesses may wish to observe and monitor shipping/traffic activity, environmental groups may wish to observe and monitor illegal fishing or dumping activity, law enforcement agencies may wish to observe and monitor drug smuggling activity, etc. Such monitoring, however, may be costly and potentially dangerous when performed on-site by an observer. Thus, it is desirable to have a system which allows such observation and monitoring to be done remotely.

Existing observation and monitoring systems suffer from several important limitations. First, existing systems are incapable of providing continuous, real-time images. Rather, existing systems typically take periodic "snapshots" of the area of interest. These snapshots are often stored for later retrieval. Second, such systems, if they are to be robust, are expensive and are often beyond the means of environmental groups, law enforcement agencies, and the like.

The present invention overcomes the limitations discussed above and provides a robust, inexpensive observation and monitoring system capable of delivering continuous, real-time images of the surface of a large predetermined area of water to an operator at a remote location.

BRIEF SUMMARY OF THE INVENTION

In one embodiment, a buoy for observing and monitoring the surface of a large predetermined area of water includes a flotation device; a waterproof imaging device attached to the exterior of the flotation device, the imaging device operable for obtaining continuous real-time images of the surface of the predetermined area of water; a waterproof computer partially or wholly disposed within the flotation device, the computer operable for storing the continuous real-time images of the surface of the predetermined area of water; and one or more communications devices partially or wholly disposed within the flotation device, the one or more communications devices operable for transmitting a signal representing the continuous real-time images of the surface of the predetermined area of water to an operator at a remote location.

DETAILED DESCRIPTION OF THE INVENTION

Figure 1:
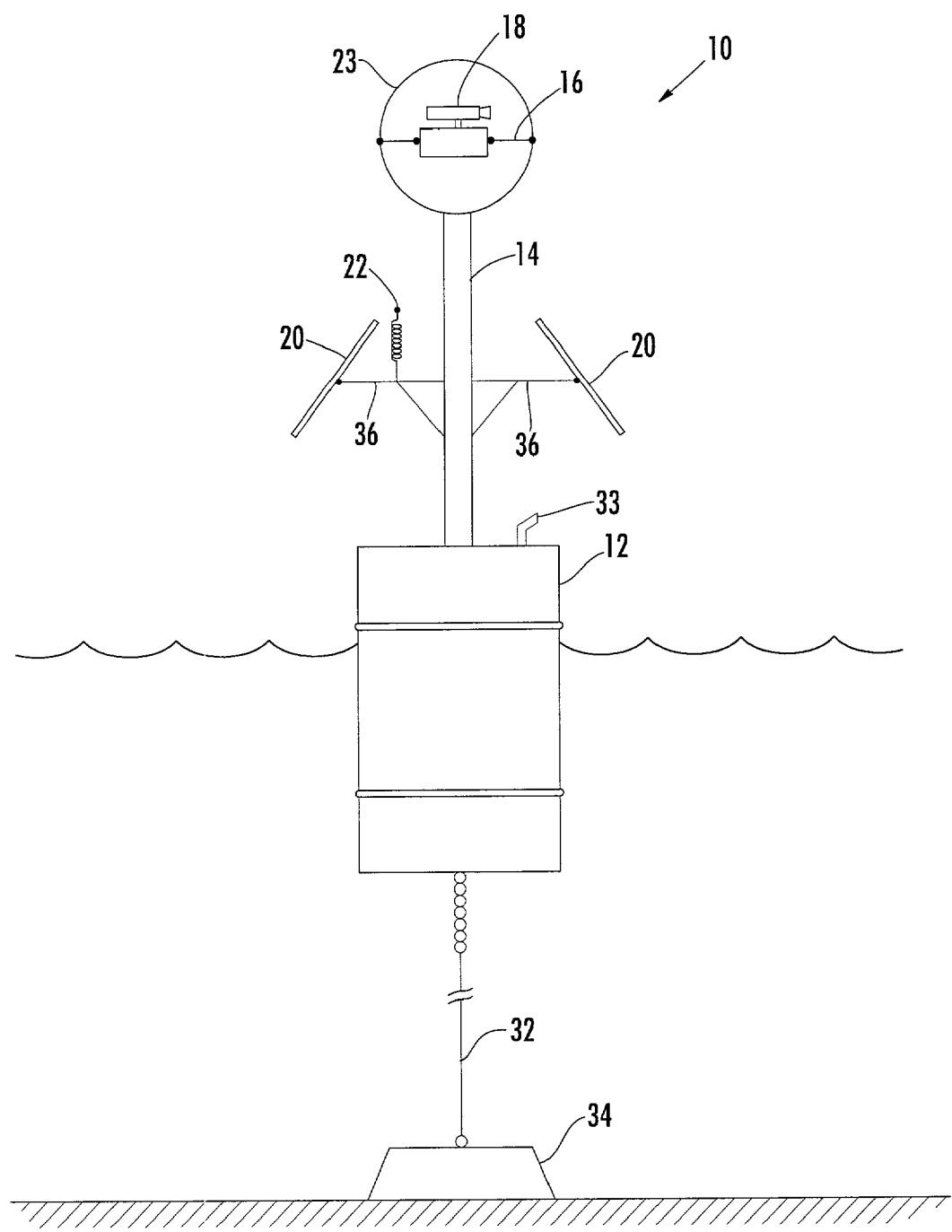
FIG. 1 is a cross-sectional side view of one embodiment of the monitoring buoy of the present invention, utilizing a protective structure.
Figure 2:
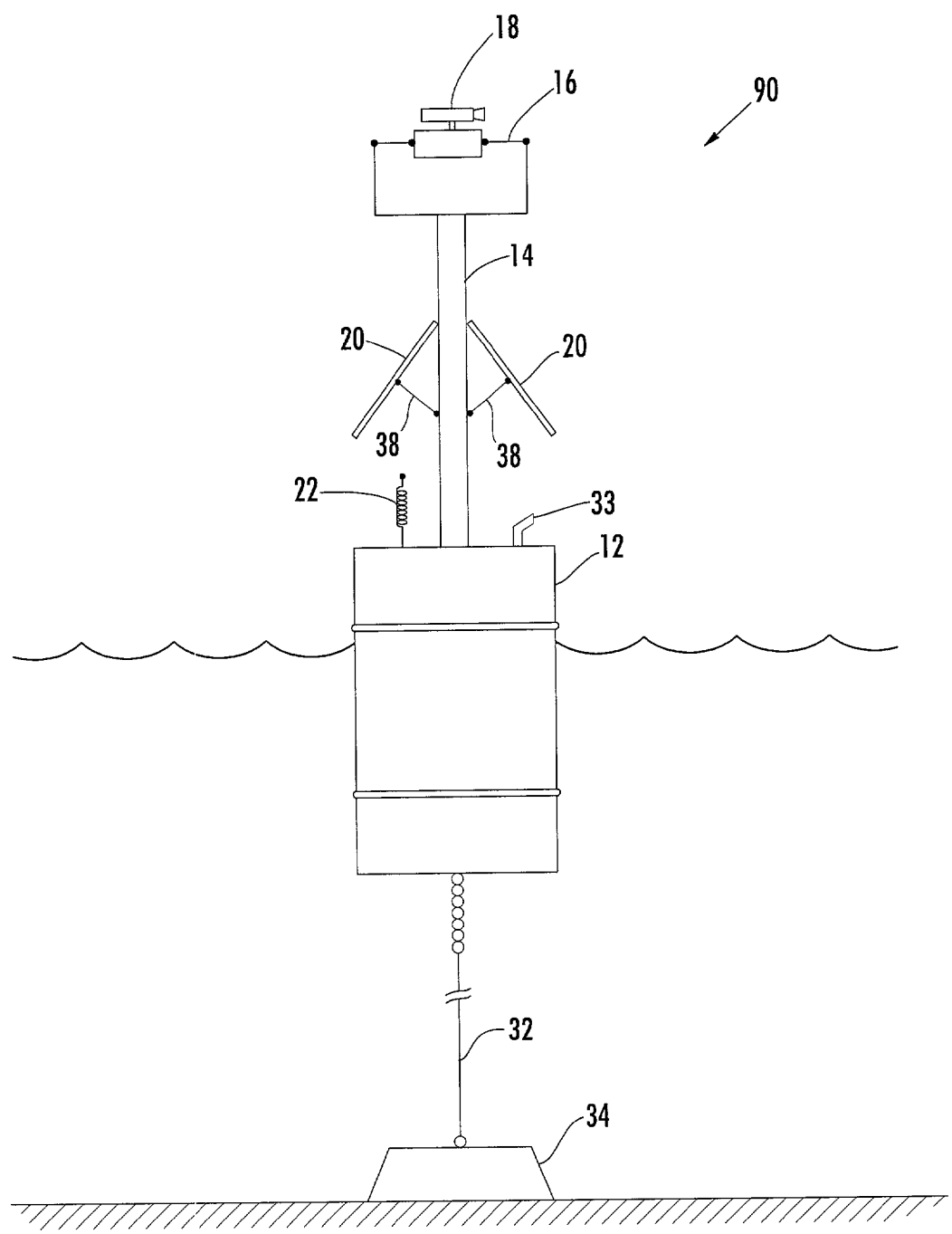
FIG. 2 is a cross-sectional side view of another embodiment of the monitoring buoy of the present invention, without the protective structure.

Referring to FIGS. 1 and 2, two embodiments of a monitoring buoy 10 and 90 of the present invention include a flotation device 12, such as a 55-gallon drum or other suitable device, for supporting a post 14, a gimbal structure 16, an imaging device 18, a plurality of energy collecting/power generating devices 20, and an antenna assembly 22. The gimbaled imaging device 18 may, optionally, be disposed within a transparent dome, globe, cylinder, or other suitable protective structure 23. A computer 24 (FIG. 3), one or more communications devices 26 (FIG. 3), a battery 28 (FIG. 3), and a positioning device 30 (FIG. 3) may be partially or wholly disposed within the flotation device 12. The flotation device 12 may be disposed within a body of water and anchored to the bottom, in a predetermined location, using, for example, a tether 32 and a mooring 34. The monitoring buoy 10 and 90 allows the surface of a predetermined area of water to be observed and monitored, remotely and in real time, using video imagery.

Figure 3:
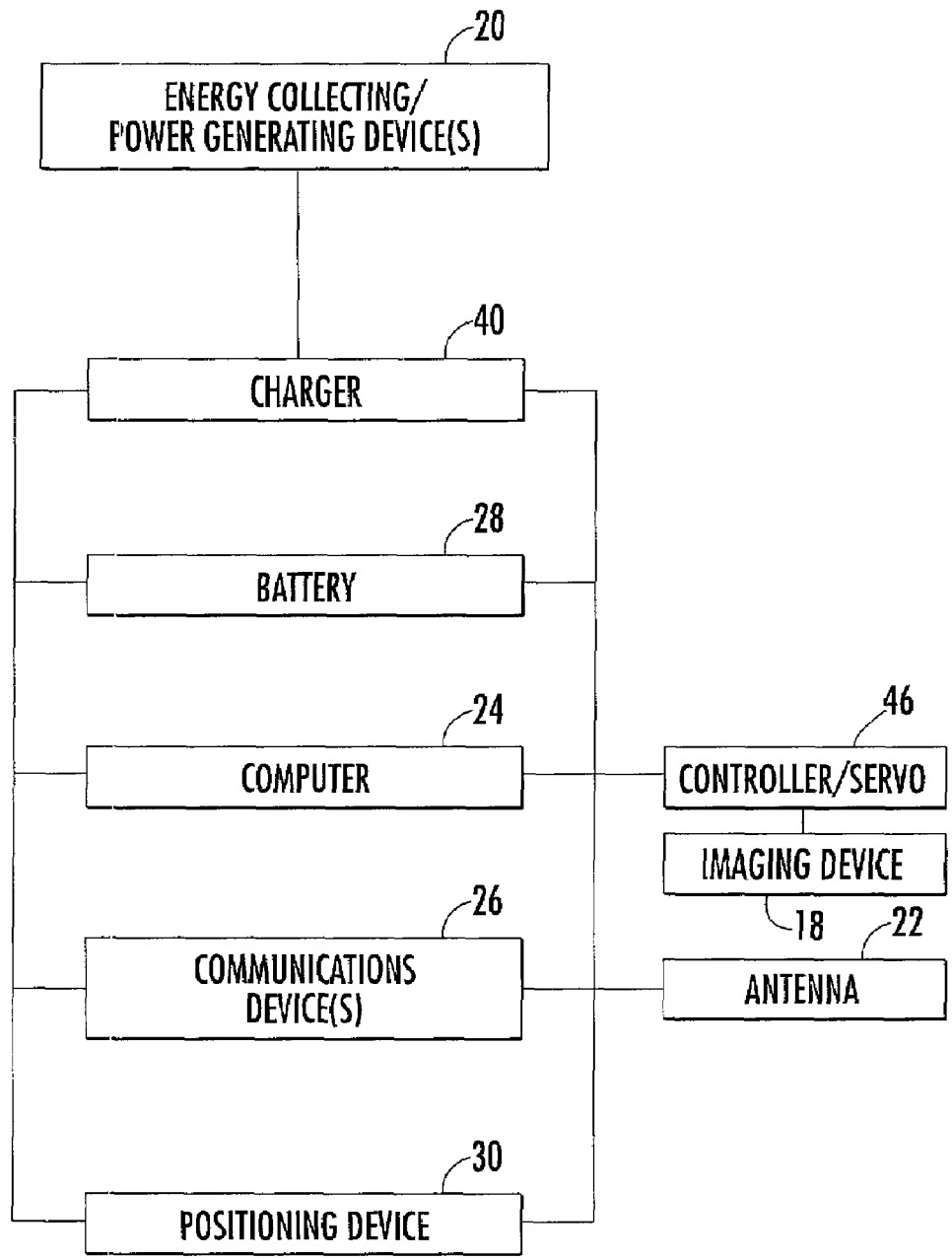
FIG. 3 is a functional block diagram of the electronic components of the monitoring buoy of the present invention.

As discussed above, the flotation device 12 may be, for example, a reinforced waterproofed 55-gallon plastic drum, steel drum, or other suitable device. The flotation device 12 preferably floats and includes a water-tight hatch or panel at the top, providing access to the interior of the flotation device 12. The flotation device 12 may also include a vent 33 at the top, above the waterline, for allowing gases which may build up inside the flotation device 12 to exit. Such gases may include, for example, those generated by the battery 28 (FIG. 3). The flotation device 12 forms a floating base to which other components of the system 10 and 90 may be attached.

The post 14 is a hollow structure extending vertically upwards from the top of the flotation device 12. The post may be, for example, a length of standard PVC pipe or any other vertically-extending, weather-resistant structure. The post 14 may be attached to the flotation device 12 using nuts and bolts, brackets, fasteners, welds, epoxy, or any other suitable retaining mechanism. The post 14 is a structure to which other above-water components of the system 10 and 90 may be attached, including the gimbal structure 16, the imaging device 18, the protective structure 23, and the plurality of energy collecting/power generating devices 20. Wires to and from the electronic components, such as the imaging device 18, may be disposed within the post 14.

As discussed above, the protective structure 23 may be a transparent, weather-resistant dome, globe, cylinder, etc. The gimbal structure 16 and imaging device 18 may be disposed within the protective structure 23. The gimbal structure 16 may be made of plastic or a metal, such as stainless steel, and may include, for example, a square outer frame member and a square inner frame member in a symmetrically spaced-apart relationship. Round or other suitably shaped frames may also be used. The outer frame may be supported on angled supports and permitted to pivot on a pair of aligned pivot shafts. The inner frame may be supported by the outer frame on another pair of aligned pivot shafts. The inner frame may also be permitted to pivot, in a direction normal to the direction of rotation of the outer frame. Thus, the gimbal structure 16 and attached imaging device 18 may be permitted to pivot in response to buoy tilting due to wind and/or currents, allowing the imaging device 18 to remain level under potentially hostile and often variable environmental conditions. The gimbal structure 16 may optionally be equipped with one or more dampers. Any gimbal structure 16 which allows the imaging device 18 to pivot along at least two axes of rotation may be used.

The imaging device 18 is preferably a self-contained, water-resistant/waterproof, battery-powered, digital video camera having image storage capability. The imaging device 18 is also preferably capable of communicating with a computer. Optionally, the imaging device 18 is a standard, camcorder-type digital video camera enclosed within a water-resistant/waterproof housing with a viewing window made of acrylic, polycarbonate, optical-quality glass, or the like. The imaging device 18 preferably includes a lens suitable for observing and monitoring the surface of a large predetermined area of water. Alternatively, the imaging device 18 may be an infrared (IR), heat-sensing, or other suitable type of imaging device for observing and monitoring the surface of a large predetermined area of water at night or under inclement environmental conditions. The imaging device 18 may be attached to the gimbal structure 16 using brackets, fasteners, or a suitable mounting device.

The plurality of energy collecting/power generating devices 20 may include, for example, a plurality of solar panels for powering the monitoring buoy 10 and 90 and its electronic components. Typically, a solar panel consists of a plurality of solar cells, each solar cell comprising a flat, semicircular photovoltaic cell. These photovoltaic cells, which may be, for example, silicon encapsulated in a clear silicone potting compound, are connected in series and covered with a glass or clear plastic sheet. Alternatively, the plurality of energy collecting/power generating devices 20 may include one or more wave-actuated electricity generating devices. The wave-actuated electricity generating devices may each include a base and a gate adapted to move in response to the pressure exerted by waves. A pushrod is pivotally coupled to each gate, operatively connecting each gate to an electrical power generator. The plurality of energy collecting/power generating devices 20 may be movable or fixedly attached to the post 14 using, for example, gimbaled supports 36 (FIG. 1) or rigid supports 38 (FIG. 2). The plurality of energy collecting/power generating devices 20 may also be attached directly to the flotation device 12.

Referring to FIG. 3, the plurality of energy collecting/power generating devices 20 are operable for maintaining the charge to the battery 28 disposed within the flotation device 12 (FIGS. 1 and 2). The battery 28 may be, for example, a standard 12 V marine battery or other suitable energy storage device. The battery 28 is operable for providing power to the imaging device 18, the computer 24, the communications device(s) 26, and the positioning device 30. Optionally, the battery 28 works in conjunction with a charger 40 disposed within the flotation device 12 (FIGS. 1 and 2).

The computer 24 is a device including inputs/outputs, a memory, and a processor for receiving, sending, storing, and processing signals and data to operate, monitor, record, and otherwise functionally control the operation of the system 10 and 90 (FIGS. 1 and 2). The computer 24 may include software, hardware, firmware, and other similar components for functionally controlling the operation of the system 10 and 90 (FIGS. 1 and 2). The computer 24 may be a single device, or it may be a plurality of devices working in concert. The computer 24 is preferably in communication with all of the electronic components of the system 10 and 90 (FIGS. 1 and 2). For example, the input device may receive input from the imaging device 18 and the positioning device 30. The output device may include a modem and may send output to the communications device(s) 26. The memory typically includes a random-access memory (RAM) and a read-only memory (ROM). The memory may also include other types of memory, such as programmable read-only memory (PROM), erasable programmable read-only memory (EPROM), and electrically erasable programmable read-only memory (EEPROM). The memory also preferably includes an operating system that executes on the processor. The operating system performs basic tasks which include recognizing input from input devices, sending output to output devices, keeping track of files and directories, and controlling various peripheral devices. The memory may also contain one or more databases. The processor accepts data and instructions from the memory and performs various calculations. The processor may include an arithmetic logic unit (ALU), which performs arithmetic and logical operations, and a control unit, which extracts instructions from the memory. Optionally, the computer 24 may also include a mass storage device and any other suitable peripheral. The above-described computer 24 may take the form of a hand-held digital computer, a laptop computer, a portable computer, a personal computer, and an industrial computer. The computer 24 is preferably water-resistant/waterproof.

The computer 24 is operable for receiving video images from the imaging device 18, storing them, and relaying them, via the modem and the communications device(s) 26, to an operator in a remote location. The communication device(s) 26 may include, for example, a cellular telephone, a mobile telephone with data capabilities, a satellite telephone, or a celemetry device. The later device is operable for sending data over the control channel of a cellular site. The commutations device(s) 26 are operably connected to the antenna assembly 22 which typically is a mobile telephone or cellular antenna and which may be fixedly attached to the top of the flotation device 12 (FIGS. 1 and 2), to the gimbaled supports 36 (FIGS. 1 and 2) movable or fixedly attached to the post 14 (FIGS. 1 and 2), or to the protective structure 23 (FIGS. 1 and 2).

The positioning device 30 is operable for providing the operator with the exact location or position of the monitoring buoy 10 and 90 (FIGS. 1 and 2) at any given time. This information is useful for identification purposes, in the event that the operator is simultaneously utilizing a plurality of monitoring buoys 10 and 90 (FIGS. 1 and 2), and to let the operator know if the monitoring buoy's tether 32 (FIGS. 1 and 2) or mooring 34 (FIGS. 1 and 2) has failed. The positioning device 30 may be, for example, a global positioning satellite (GPS) or similar device. Optionally, the positioning device 30 may be an integral part of the mobile telephone.

Referring again to FIGS. 1 and 2, the tether 32 may include a chain, rope, cord, other suitable device, or combinations thereof for fixing the flotation device 12 to the mooring 34. The mooring 34 may include a weight, a piling, or other suitable movable or fixed structure. The tether 32 is preferably attached to the flotation device 12 and the mooring 34 via a swivel, eyelet, or other suitable mechanism.

Figure 4:
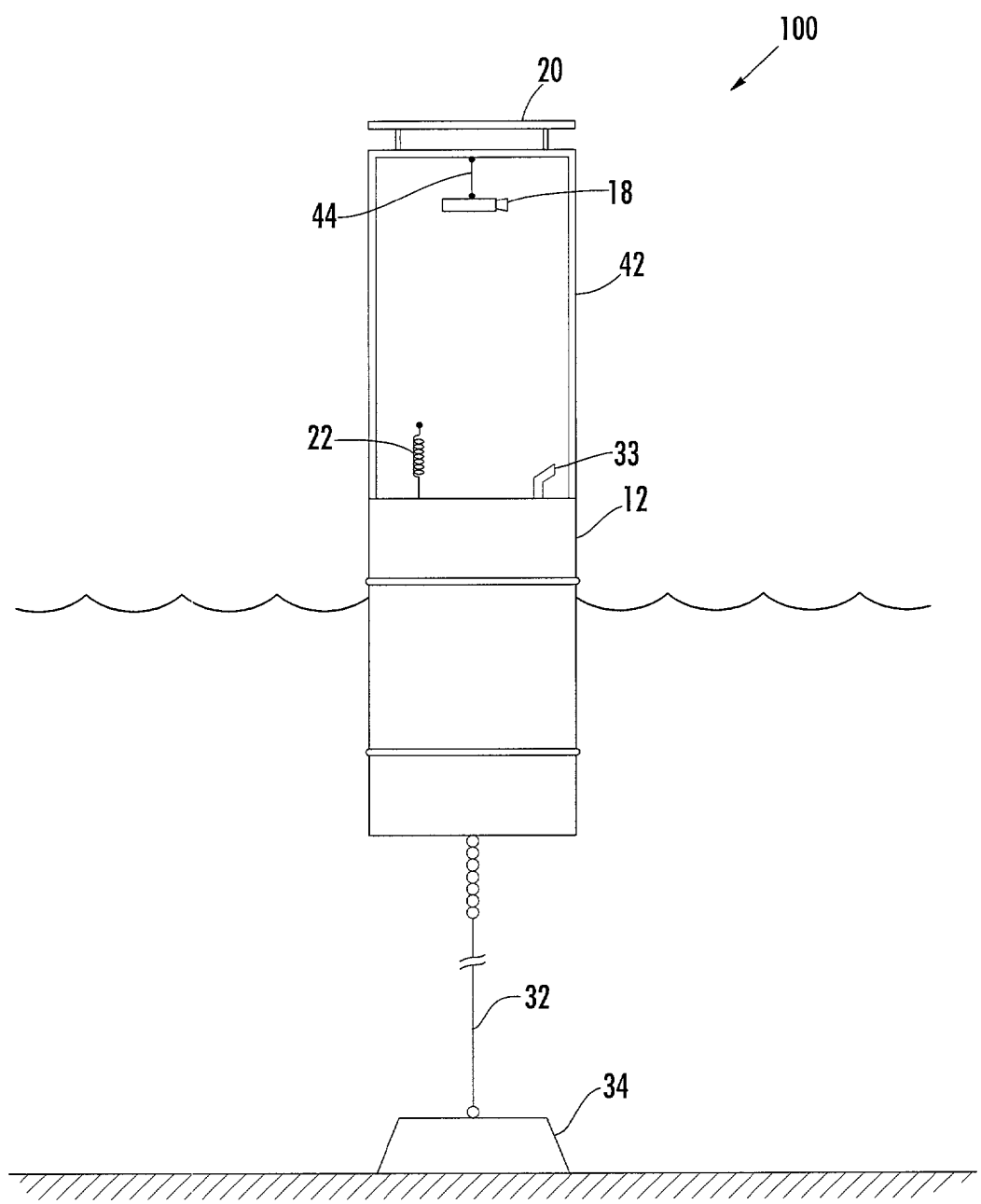
FIG. 4 is a cross-sectional side view of a further embodiment of the monitoring buoy of the present invention, utilizing a housing structure.

Referring to FIG. 4, an alternative embodiment of the monitoring buoy 100 of the present invention includes a flotation device 12, such as a 55-gallon drum or other suitable device, for supporting a housing 42, a support structure 44, an imaging device 18, a plurality of energy collecting/power generating devices 20, and an antenna assembly 22. The gimbaled imaging device 18 is disposed within the transparent, cylindrical housing 42. Optionally, the housing 42 is made of translucent or opaque plastic, metal, or other suitable water-resistant/waterproof material and has optically-transparent windows or panels. The cylindrical housing 42, windows, or panels may be made of, for example, acrylic, polycarbonate, optical-quality glass, or the like. The imaging device 18 may be suspended from the support structure 44 such that the imaging device 18 may sway, allowing it to remain steady in the presence of wind/current-induced buoy motion. The support structure 44 may optionally include one or more dampers. A computer 24 (FIG. 3), one or more communications devices 26 (FIG. 3), a battery 28 (FIG. 3), and a positioning device 30 (FIG. 3) may be partially or wholly disposed within the flotation device 12. The flotation device 12 may be disposed within a body of water and anchored to the bottom, in a predetermined location, using, for example, a tether 32 and a mooring 34. As with the embodiments discussed above 10 (FIG. 1) and 90 (FIG. 2), the monitoring buoy 100 allows the surface of a predetermined area of water to be observed and monitored, remotely and in real time, using video imagery.

In a further embodiment, the monitoring buoy 10, 90, and 100 (FIGS. 1, 2, and 3) may also include a controller 46 (FIG. 3) and/or a servo mechanism partially or wholly disposed within the flotation device 12 (FIGS. 1, 2, and 3) and in communication with the computer 24 (FIG. 3) for controlling the orientation/position of the gimbaled imaging device 18 (FIGS. 1, 2, and 3). Thus, the operator may remotely manipulate the predetermined area of water observed and monitored.

The present invention has been described with reference to examples and preferred embodiments. Other examples and embodiments may achieve the same results. Variations in and modifications to the present invention will be apparent to those skilled in the art and the following claims are intended to cover all such equivalents.

What is claimed is:

1. A stationary or fixed-position buoy for observing and monitoring the surface of a predetermined area of water, comprising:
    a flotation device;
    a non-encapsulated and waterproof imaging device attached to the exterior of the flotation device, the imaging device operable for obtaining continuous real-time images of the surface of the predetermined area of water;
    a waterproof computer partially or wholly disposed within the flotation device, the computer operable for storing the continuous real-time images of the surface of the predetermined area of water; and
    one or more communications devices partially or wholly disposed within the flotation device, the one or more communications devices operable for transmitting a signal representing the continuous real-time images of the surface of the predetermined area of water to an operator at a remote location.

2. The buoy of claim 1, further comprising a gimbal structure attached to the exterior of the flotation device and to the imaging device, the gimbal structure operable for allowing the imaging device to remain level in the presence of buoy tilting caused by wind and/or water currents.

3. The buoy of claim 1, further comprising a power source partially or wholly disposed within the flotation device, the power source operable for providing power to the imaging device, the computer, and the one or more communications devices.

4. The buoy of claim 1, further comprising a plurality of energy collecting/power generating devices attached to the exterior of the flotation device, the plurality of energy collecting/power generating devices operable for maintaining the voltage level of the power source.

5. The buoy of claim 1, wherein the one or more communications devices further comprise one or more mobile telephones having data transmission capability.

6. The buoy of claim 1, wherein the one or more communications devices further comprise one or more telemetry devices.

7. The buoy of claim 1, further comprising a tether and a mooring attached to the exterior of flotation device, the tether and the mooring operable for securing the flotation device in a predetermined location said stationary or fixed-position.

8. The buoy of claim 1, further comprising a controller associated with the imaging device, the controller operable for controlling the orientation of the imaging device relative to the surface of the predetermined area of water.

9. A stationary or fixed-position buoy for observing and monitoring the surface of a predetermined area of water comprising:
    a flotation device;
    an encapsulated imaging device attached to the exterior of the flotation device, the imaging device operable for obtaining continuous real-time images of the surface of the predetermined area of water;
    a computer partially or wholly disposed within the flotation device, the computer operable for storing the continuous real-time images of the surface of the predetermined area of water;
    one or more communications devices partially or wholly disposed within the flotation device, the one or more communications devices operable for transmitting a signal representing the continuous real-time images of the surface of the predetermined area of water to an operator at a remote location; and
    a gimbal structure attached to the exterior of the flotation device and to the imaging device, the gimbal structure operable for allowing the imaging device to remain level in the presence of buoy tilting caused by wind and/or water currents.

10. The buoy of claim 9, further comprising a power source partially or wholly disposed within the flotation device, the power source operable for providing power to the imaging device, the computer, and the one or more communications devices.

11. The buoy of claim 9, further comprising a plurality of energy collecting/power generating devices attached to the exterior of the flotation device, the plurality of energy collecting/power generating devices operable for maintaining the voltage level of the power source.

12. The buoy of claim 9, wherein the one or more communications devices further comprise one or more mobile telephones having data transmission capability.

13. The buoy of claim 9, wherein the one or more communications devices further comprise one or more telemetry devices.

14. The buoy of claim 9, further comprising a tether and a mooring attached to the exterior of the flotation device, the tether and the mooring operable for securing the flotation device in a predetermined location said stationary or fixed-position.

15. The buoy of claim 9, further comprising a controller associated with the imaging device, the controller operable for controlling the orientation of the imaging device relative to the surface of the predetermined area of water.

16. A stationary or fixed-position buoy for observing and monitoring the surface of a predetermined area of water, said buoy comprising:
    a flotation device being a 55-gallon plastic drum;

a non-encapsulated and waterproof imaging device attached to the exterior of the flotation device, the imaging device operable for obtaining continuous real-time images of the surface of the predetermined area of water and having a transparent dome structure;

a waterproof computer partially or wholly disposed within the flotation device, the computer operable for storing the continuous real-time images of the surface of the predetermined area of water;

one or more communications devices partially or wholly disposed within the flotation device, the one or more communications devices operable for transmitting a signal representing the continuous real-time images of the surface of the predetermined area of water to an operator at a remote location;

a plurality of energy collecting/power generating devices attached to the exterior of the flotation device, the plurality of energy collecting/power generating devices operable for maintaining a voltage level of a power source; and a tether and a mooring attached to the exterior of flotation device, the tether and the mooring operable for securing the flotation device in said stationary or fixed-position;

wherein said imaging device is a digital video camera with infrared (IR) and heating-sensing capabilities;

wherein each of said plurality of energy collecting/power generating devices is a plurality of solar panels, each of said plurality of solar cells having of a plurality of photovoltaic cells connected in series, each of said photovoltaic cells being silicon encapsulated in a clear silicon potting compound; and wherein said tether is attached to said flotation device and said mooring via a swivel.

17. The buoy of claim 16, further comprising a gimbal structure attached to the exterior of the flotation device and to the imaging device, the gimbal structure operable for allowing the imaging device to remain level in the presence of buoy tilting caused by wind and/or water currents.

18. The buoy of claim 16, further comprising a power source partially or wholly disposed within the flotation device, the power source operable for providing power to the imaging device, the computer, and the one or more communications devices.

* * * * *